No. 815,662. PATENTED MAR. 20, 1906.
W. H. WALDRON.
ADJUSTING DEVICE FOR PRINTING BLOCKS.
APPLICATION FILED SEPT. 11, 1905.
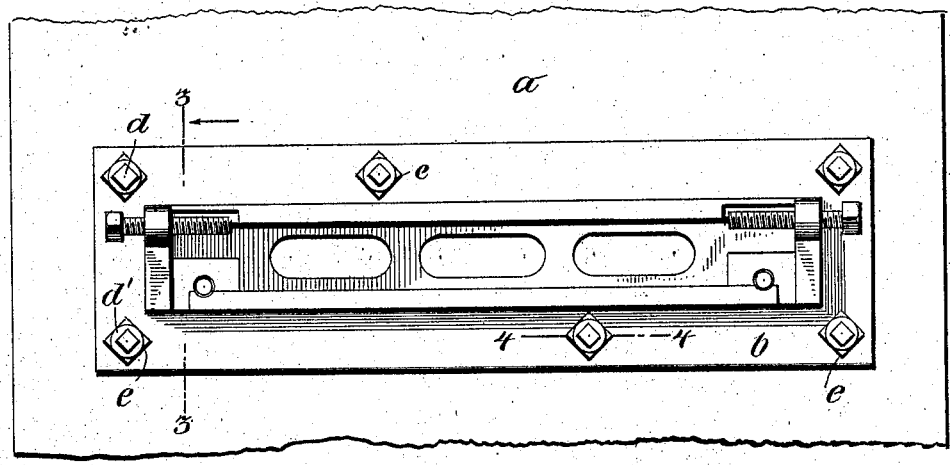
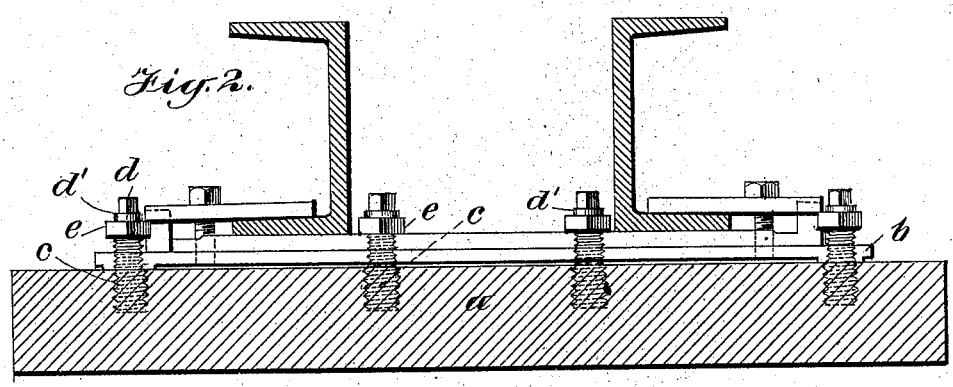
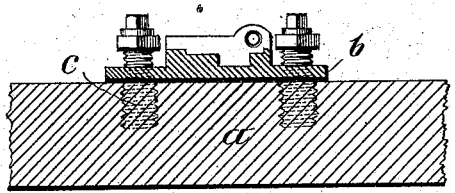
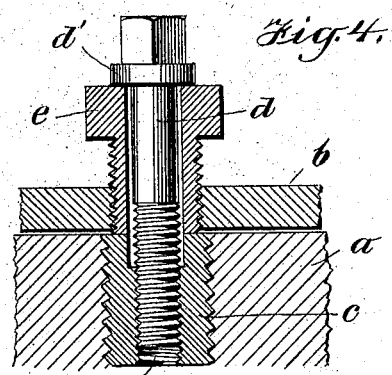
WITNESSES:
INVENTOR
William H. Waldron
BY
ATTORNEYS

UNITED STATES PATENT OFFICE.

WILLIAM HUBELI WALDRON, OF NEW BRUNSWICK, NEW JERSEY, ASSIGNOR TO THE JOHN WALDRON COMPANY, OF NEW BRUNSWICK, NEW JERSEY.

ADJUSTING DEVICE FOR PRINTING-BLOCKS.

No. 815,662.     Specification of Letters Patent.     Patented March 20, 1906.

Application filed September 11, 1905. Serial No. 277,892.

*To all whom it may concern:*

Be it known that I, WILLIAM HUBELI WALDRON, a citizen of the United States, and a resident of New Brunswick, in the county of Middlesex and State of New Jersey, have invented a new and Improved Adjusting Device for Printing-Blocks, of which the following is a full, clear, and exact description.

The printing-blocks with which linoleum-printing machines are supplied are of considerable length, and consequently are apt to bend, so that parts of the printing-surface are impressed with too much force upon the fabric and other parts are either impressed too lightly or do not print at all.

The principal object of my invention is to provide means for adjusting the printing-block in such a manner that the several parts thereof can be forced outwardly or inwardly in order to overcome defects due to bending and to present an even printing-surface.

Reference is to be had to the accompanying drawings, forming a part of this specification, in which similar characters of reference indicate corresponding parts in all the figures.

Figure 1 is a plan of a plate supporting a printing-block for linoleum-printing machines. Fig. 2 is a longitudnial sectional view of the same. Fig. 3 is a sectional view on the line 3 3 of Fig. 1, and Fig. 4 is a sectional view on the line 4 4 of Fig. 1 on an enlarged scale.

The block $a$ is connected with the plate $b$ at a plurality of points, and the connections made between the two elements are of such a nature as to provide for adjustment, so that the block can be placed at a greater distance from the plate at one place than at another, if desired. In order to accomplish this result, I place a nut or bushing $c$ in a screw-threaded opening in the block $a$. It can be adjusted, but is preferably located with its end flush with the surface of the blocks. This nut is provided with a screw-threaded passage $c'$, in which fits a bolt $d$. This bolt has a collar $d'$ or washer, constituting means for engaging an adjustable element, shown as a hollow screw $e$, which fits a screw-threaded opening in the plate $b$. The bolt $d$ passes through the hollow screw $e$. When the screw $e$ and nut $c$ are fixed in the elements $b$ and $a$, respectively, with their surfaces flush with each other the bolt $d$ can be passed through the screw and into the nut, with the collar or washer $d'$ resting on the top of the head of the screw, so as to secure the parts together. If it is desired to force the block and plate away from each other at this point, the bolt is loosened and the screw $e$ operated to project against the nut and force these elements apart. Then the bolt is again tightened, and it will hold the several elements in the desired position. The several parts of the block may be adjusted in this manner, so as to provide as near as possible an even printing-surface on the opposite side.

Having thus described my invention, I claim as new and desire to secure by Letters Patent—

1. The combination of a printing-block, a plate for supporting it, and a plurality of means for securing the block to the plate, said means being located at intervals along the plate, and each having means for moving the block both toward and from the plate and securing it in an adjusted position.

2. The combination with a printing-block for linoleum-printing machines, of a plate for supporting the block, and a series of connections between the plate and block, located at intervals along the adjacent surfaces of the plate and block each of said connections comprising means for forcing the block both toward and from the plate and thus adjusting the distance between the block and plate.

3. The combination of a printing-block, a plate for supporting it, a screw adjustably mounted on the block, and means adjustably mounted on the plate for bearing against the screw and limiting its motion toward the block.

4. The combination of a printing-block, a nut or bushing mounted thereon, a supporting-plate, an adjustable element mounted on the plate, and a bolt having means for bearing against the rear surface of the said element and adapted to engage the nut or bushing in the block to provide an adjustable connection between the block and plate.

5. The combination of a printing-block for linoleum-printing machines, a nut mounted therein and provided with screw-threads, a plate, a hollow screw adjustably mounted on said plate and projecting through it to the surface adjacent to the surface of the block, and a bolt having a collar engaging said screw and a screw-threaded portion engaging the screw-threaded opening of the nut for locking the parts together.

6. A fastening device for a printing-block, comprising a nut having a screw-threaded opening, a hollow screw adapted to bear on the nut, and a bolt passing through the hollow screw and engaging said screw-threaded opening and the opposite end of the screw.

In testimony whereof I have signed my name to this specification in the presence of two subscribing witnesses.

WILLIAM HUBELI WALDRON.

Witnesses:
SAM F. WYLIE,
E. A. WALDRON.